Figure 1:
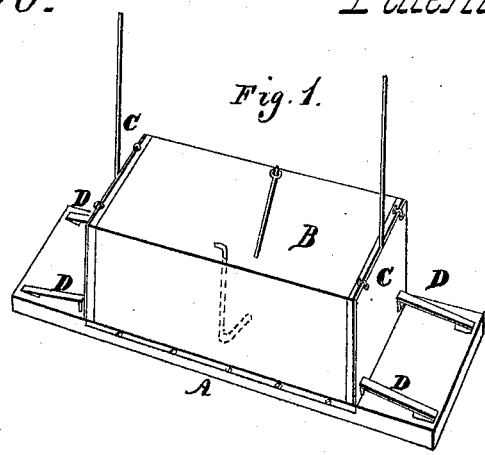

B. B. & J. R. Hill,
Cage Trap,
N° 46,356. Patented Feb. 14, 1865.

Witnesses
Jas. C. Morse
Wm. Greenleaf

Inventors
Benj. B. Hill
John R. Hill

UNITED STATES PATENT OFFICE.

BENJAMIN B. HILL AND JOHN R. HILL, OF WORCESTER, MASSACHUSETTS.

IMPROVEMENT IN BOX-TRAPS FOR ANIMALS.

Specification forming part of Letters Patent No. 46,356, dated February 14, 1865.

*To all whom it may concern:*

Be it know that we, BENJAMIN B. HILL and JOHN R. HILL, of the city and county of Worcester, State of Massachusetts, have invented certain new and useful Improvements in Traps; and we hereby declare the following to be a full, clear, and exact description of the construction and operation of the same, reference being had to the accompanying drawings by the letters of reference marked thereon.

The object of our invention is to so arrange and construct the trap that it shall retain the animal when caught; and its nature consists in providing and applying suitable self-operating fastenings, which shall lock the trap securely on its shutting against all efforts of whatever may be caught.

Our improvement applies more particularly to the class of traps shown in the drawings, in which—

Figure 2:
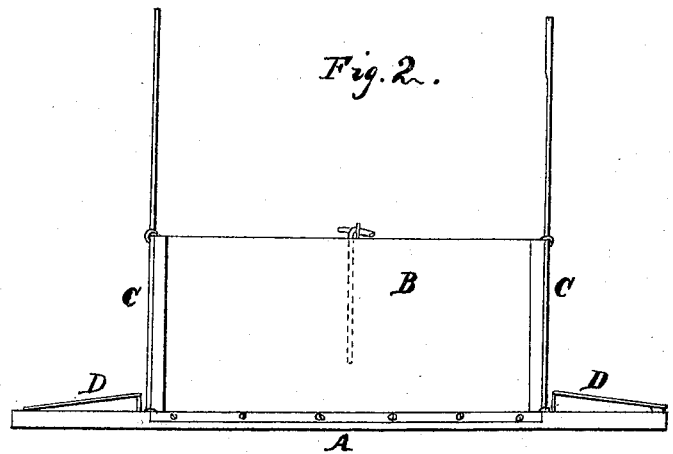
Figure 3:
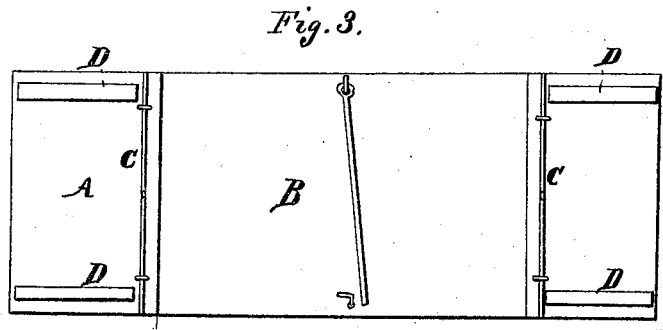

Figure 1 is a perspective view. Fig. 2 is a side view, and Fig. 3 is a plan or view from above, the same letters indicating the same parts in each.

A is the base or bottom; B, the body of the trap; C C, the doors or lids, provided with springs and tripping catch in any of the usual forms; and D D D D are the locking-catches, so arranged and constructed as to allow the doors C C to depress and pass over them, and then to rise and form a stop or lock that fastens them. The other parts may be of almost any of the usual forms common to this class of traps; therefore a particular description of them is not deemed necessary.

The operation of setting requires the catches D D D D to be pressed down to allow the doors C C to be opened and set in the usual way, and on springing the trap they (the doors) are thrown down on the catches D D D D, and, pressing them down, pass over to place, when the catches rise behind them, forming a lock-stop, so as to effectually resist any attempt of the incaged animal to press open the doors.

What we claim as new, and desire to secure by Letters Patent, is—

The locking-catches D D D D, when constructed and operating in the manner and for the purposes above set forth.

In testimony whereof we have hereunto set our hands in the presence of two witnesses.

BENJ. B. HILL.
JOHN R. HILL.

Witnesses:
JAS. C. MORSE,
WM. GREENLEAF.